US008526979B2

(12) United States Patent
Chin et al.

(10) Patent No.: US 8,526,979 B2
(45) Date of Patent: Sep. 3, 2013

(54) METHOD AND APPARATUS FOR PARENT-CONTROLLED SHORT MESSAGE SERVICE

(75) Inventors: Frances Chin, Naperville, IL (US); Alok Sharma, Lisle, IL (US); John Reid, Naperville, IL (US)

(73) Assignee: Alcatel Lucent, Paris (FR)

( * ) Notice: Subject to any disclaimer, the term of this patent is extended or adjusted under 35 U.S.C. 154(b) by 1289 days.

(21) Appl. No.: 11/641,512

(22) Filed: Dec. 19, 2006

(65) Prior Publication Data

US 2008/0146259 A1 Jun. 19, 2008

(51) Int. Cl.
*H04W 4/00* (2009.01)

(52) U.S. Cl.
USPC ..... 455/466; 455/434; 455/435.3; 455/414.1; 455/515; 455/405; 455/419; 455/404.1; 455/408; 455/436; 370/352; 370/351

(58) Field of Classification Search
USPC ............... 455/434, 435.3, 414.1, 515, 466, 455/405, 419, 456.1, 404.1, 408, 522, 436, 455/560, 415; 370/352, 351; 709/206, 207
See application file for complete search history.

(56) References Cited

U.S. PATENT DOCUMENTS

| | | | | |
|---|---|---|---|---|
| 5,603,081 | A * | 2/1997 | Raith et al. | 455/435.3 |
| 5,778,316 | A * | 7/1998 | Persson et al. | 455/434 |
| 7,177,934 | B2 * | 2/2007 | Matena et al. | 709/226 |
| 7,197,321 | B2 * | 3/2007 | Erskine et al. | 455/456.1 |
| 7,302,272 | B2 * | 11/2007 | Ackley | 455/466 |
| 7,428,580 | B2 * | 9/2008 | Hullfish et al. | 709/207 |
| 2002/0165777 | A1 * | 11/2002 | Lotvin et al. | 705/14 |
| 2003/0131264 | A1 * | 7/2003 | Huff et al. | 713/202 |
| 2003/0137536 | A1 * | 7/2003 | Hugh | 345/744 |
| 2004/0082346 | A1 * | 4/2004 | Skytt et al. | 455/456.3 |
| 2004/0230495 | A1 * | 11/2004 | Lotvin et al. | 705/26 |
| 2005/0089006 | A1 | 4/2005 | Wang et al. | |
| 2005/0096009 | A1 * | 5/2005 | Ackley | 455/405 |
| 2005/0113119 | A1 | 5/2005 | Tu et al. | |
| 2005/0170856 | A1 * | 8/2005 | Keyani et al. | 455/466 |
| 2005/0186943 | A1 | 8/2005 | Hasan et al. | |
| 2005/0197110 | A1 | 9/2005 | Hasan et al. | |
| 2006/0056385 | A1 * | 3/2006 | Fotta et al. | 370/351 |
| 2006/0075052 | A1 * | 4/2006 | Oostendorp | 709/206 |
| 2006/0077956 | A1 * | 4/2006 | Saksena et al. | 370/352 |
| 2006/0223584 | A1 | 10/2006 | Sharma | |
| 2006/0271696 | A1 | 11/2006 | Chen et al. | |
| 2007/0060109 | A1 * | 3/2007 | Ramer et al. | 455/414.1 |

FOREIGN PATENT DOCUMENTS

| | | | |
|---|---|---|---|
| EP | 1 662 815 A | | 5/2006 |
| GB | 2384330 A | * | 7/2003 |
| WO | WO 01/78428 | | 10/2001 |
| WO | WO 01/78428 A | | 10/2001 |
| WO | WO 2004/012469 A | | 2/2004 |

OTHER PUBLICATIONS

International Search Report (dated May 8, 2008).
Chinese Office Action (with translation) dated Oct. 9, 2011.

* cited by examiner

*Primary Examiner* — Joseph Arevalo
(74) *Attorney, Agent, or Firm* — Fay Sharpe LLP (57) ABSTRACT

A method of processing short message service (SMS) calls for a subscriber's communication device in a communication network is provided. The method comprises: receiving an SMS request involving the communication device at a short message service center; accessing a family access control database storing family access control information received for the communication device; and determining whether the short message service request should be allowed or denied based on the information found in the database.

6 Claims, 6 Drawing Sheets

METHOD AND APPARATUS FOR PARENT-CONTROLLED SHORT MESSAGE SERVICE

BACKGROUND OF THE INVENTION

This invention relates generally to short message service (SMS) and, more particularly, to a method and apparatus for allowing subscribers (e.g., parents) to control the short message access of others who may use their mobile phones (e.g., children). However, it is to be appreciated that the invention is also amenable to other applications. For example, the invention may be implemented for clients with enhanced message service (EMS), multimedia message service (MMS), and other types of message services.

By way of background, short message service (SMS) is the transmission of short text messages to and from a directory number and/or an Internet protocol (IP) address. It is a store and forward way of transmitting messages to and from mobiles. The message (text only) from the sending mobile is stored in a central short message service center (SMSC), which then forwards it to the destination mobile. This means that in the case where the recipient is not available the short message is stored in a database and can be sent later. Each short message can be no longer than 160 characters. These characters can be text (alphanumeric) or binary Non-Text Short messages.

Current telecommunication networks provide point-to-point SMS. Typically, SMS is used to transmit messages to and from mobile stations (MSs) via wireless networks, including personal communication system (PCS), global system for mobile communications (GSM), code division multiple access (CDMA), time division multiple access (TDMA), and paging networks. However, other types of devices capable of transmitting or receiving short messages via other types of networks, such as the public switched telephone network (PSTN), private telephone networks, the Internet, and private intranets and internets, have also been developed.

One of the common applications of SMS includes exchanging small messages like "See you at 7.30 tonight at xyz." SMS is particularly suited for these kinds of short messages because SMS is much cheaper than calling some one and giving the same message. Calling some one to give the same message would invariably take more time and hence more cost. Also, many operators offer e-mail service over SMS. Every user is assigned an e-mail address at signup and any message delivered to that email is converted to short messages and delivered to the mobile. It is possible to send e-mail messages (less than 160 characters) from a mobile phone to any e-mail address via SMS. Further, information services like news, weather, entertainment and stock prices etc. can be availed just by sending a keyword like NEWS, WEATH etc. to the short message center number.

Thus, SMS has become a convenient way for youngsters to communicate with their friends and classmates without invoking a voice call. In certain areas, SMS calls are even billed at a lower rate than regular voice calls. As SMS becomes more popular, uninvited or inappropriate messages may get delivered to subscribers. Also, some of the youngsters' friends may send improper short messages to them.

The present invention contemplates a new and improved method and apparatus that resolve the above-referenced difficulties and others.

SUMMARY OF THE INVENTION

A method and apparatus for allowing subscribers (e.g., parents) to control the short message access of others who may use their mobile phones (e.g., children) are provided.

In one aspect of the invention a method of processing short message service (SMS) calls for a subscriber's communication device in a communication network is provided. The method comprises: receiving an SMS request involving the communication device at a short message service center; accessing a family access control database storing family access control information received for the communication device; and determining whether the short message service request should be allowed or denied based on the information found in the database.

In another aspect of the invention an apparatus for processing short messages for a subscriber's communication device in a communication network is provided. The system comprises: a family access control database storing family access control information for the communication device; and a short message service center, wherein the short message service center is operative to access the family access control database and determining whether a short message service request should be allowed or denied based on the information found in the database.

In yet another aspect of the invention a storage medium storing a set of program instructions executable on a data processing device and usable to processing short messages for a communication device in a communication network is provided. The set of program instructions comprises: instructions for receiving a short message service request at a short message service center; instructions for accessing a family access control database storing family access control information for the communication device; and instructions for determining whether the short message service request should be allowed or denied based on the information found in the database.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
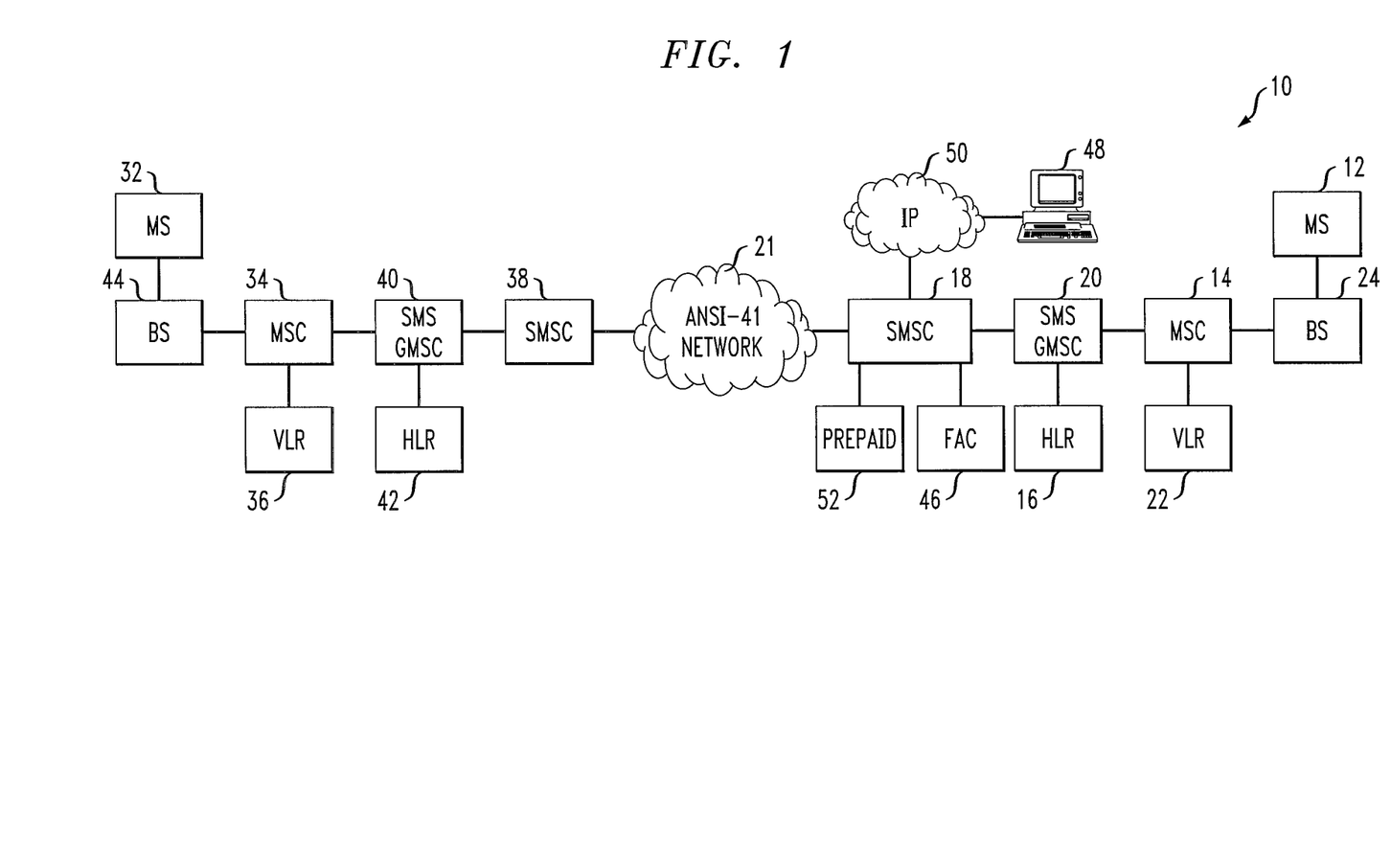
FIG. 1 is a block diagram showing a communication environment suitable for practicing aspects of the present invention.

Referring now to the drawings wherein the showings are for purposes of illustrating the exemplary embodiments only and not for purposes of limiting the claimed subject matter, FIG. 1 provides a view of a basic communication system 10 into which the presently described embodiments may be incorporated. The system 10 may include wireless (CDMA, GSM, UMTS), wireline (PSTN;, PLMN) and/or 3GPP/3GPP2 multimedia components, for example.

A standard known as ANSI-41 (aka TIA/EIA-41 or IS-41) provides roaming services for CDMA systems. It is a good example of a Mobile Application Protocol (MAP), which is a high-level protocol that allows major elements of the wireless network to communicate. The major network elements are described below.

A first communication device 12 represents the subscriber's communication device and is shown as being in communication with the system 10. The first communication device 12 may be of any type of communication device suitable for receiving and sending short messages, including mobile telephones, handheld computing or digital devices such as personal digital assistants (PDAs), or any other such devices. In our example, the first communication device 12 is shown as a mobile station that will be used, at least part of the time, by others, such as the subscriber's children.

The first mobile station 12 communicates with a first mobile switching center (MSC) 14 that directs communications between the first mobile station 12 and various communication channels in the system 10. The main function of the first MSC 14 is to route calls and perform call handling functions. The first MSC 14 generally routes calls by accessing information in a database such as a Home Location Register (HLR) 16. The system 10 may include multiple MSCs 14 that are collocated or spaced geographically apart.

A first SMSC (Short Message Service Center) 18 is the entity that performs the jobs of storing and forwarding messages to and from the first mobile station 12.

A first SMS Gateway MSC (SMS GMSC) 20 is a gateway MSC that can also receive short messages. The first SMS GMSC 20 is a mobile network's point of contact with the ANSI-41 Networks 21. Telephony networks contain many highly computerized elements that need to communicate by sending messages. This is known as signaling. SS7 (Signaling System Number 7) is a digital signaling system that connects the telephony network together. It has largely replaced older, tone-based signaling systems, particularly in the core network. SS7 is ideally suited for transporting ANSI-41 messages. It has the ability to transport messages between any two points on the network (e.g. between an MSC and an HLR). SS7 messages are addressed either by point-code (a unique numeric address assigned to every telephony network) or by global title (use of a telephony-oriented address, such as a calling card number, IMSI or phone number). The point-code corresponds to the IP address on the internet (it even has a subsystem number that corresponds to the port number used by TCP and other higher-level IP protocols) and the global title corresponds to a domain name.

Most ANSI-41 networks either use the ANSI SS7 network, or have a method of directly addressing ANSI point codes.

Upon receiving the short message from the first SMSC 18, the first SMS GMSC 20 may use the ANSI SS7 network to interrogate the current position of the first mobile station 12 from the first HLR 16.

The first HLR 16 typically contains subscriber/customer profile information, and it may also contain mobility management information, in the case of wireless networks, i.e., the area (covered by a MSC) where the first mobile station 12 is currently situated. The first SMS GMSC 20 is thus able to pass on the short message to the correct MSC. The first HLR 16 may also include an Authentication Center (not shown), which contains cryptographic information that allows the network to determine that a mobile station is valid.

A VLR (Visitor Location Register) corresponds to each MSC and contains temporary information about the mobile station, including information such as mobile identification and the cell (or a group of cells) where the mobile station is currently situated. Thus, the system 10 includes a first VLR 22, which is communication with the first MSC 14. Using information form the first VLR 22, the first MSC 14 is able to switch the information (short message) to a corresponding first Base Station (BS) 24, which transmits the short message to (or receives the short message from) the first mobile station 12. The first BS 24 consists of transceivers that send and receive information over the air interface to and from the first mobile station 12. This information is passed over the signaling channels so the mobile can receive messages even if a voice or data call is going on.

Any number of additional communication devices (or mobile stations) 32 may receive and send short messages. A corresponding set of network components, such as a second MSC 34, a second VLR 36, a second SMSC 38, a second SMS GMSC 40, a second HLR 42, and a second BS 44, enable the additional mobile stations 32 to perform these functions as described above.

Preferably, the first SMSC 18 includes a special Family Access Control (FAC) database 46, which stores the control rules for SMS with respect to the first mobile station 12, as described more fully below. The subscriber 48 may communicate with the SMSC 18 through an IP network 50 or other suitable network in order to input (set-up and update) the parental control data applicable to the mobile station 12 and stored in the FAC database 46. In addition, the system 10 may include a Prepaid function 52, which includes information concerning the status of the subscriber's prepaid account, if applicable. Prepaid in general means that subscriber pays a certain amount of money first and then the service provider deducts the appropriate amount based on the real usage. The Usage Quota as described herein is specifically used with the Prepaid function 52.

The representation of the communication system 10 in FIG. 1 is simplified to minimize its complexity. It should be understood that the communication system 10 may comprise other elements and facilities necessary for the operation of the communication system 10. As used herein, "originating" and "terminating" refers to the endpoints of a call. That is, originating refers to the caller making the call and to the corresponding network elements necessary to make the call, and terminating refers to the person receiving the call and to the corresponding network elements necessary to receive the call.

The first operation is for the subscriber (e.g., a parent) to set up the parameters of controlled SMS for a given mobile station, which may then be used by others (e.g., one or more children). Thus, the subscriber must access his or her account on the service provider's Web site or call the service provider directly. The subscriber then inputs the desired rules controls that are to be loaded into a special Family Access Control (FAC) database 46 at the SMSC 18.

The following rules for SMS or voice control may be applied:

"Unrestricted" refers to a subscriber level configuration that disables/enables the parent control service.

"Always Allowed" refers to a listing of directory numbers for which outgoing and incoming voice and SMS calls are always allowed.

"Always Barred" refers to a listing of directory numbers for which outgoing and incoming voice and SMS calls are always barred.

"Allowed Periods" refers to calls to/from directory numbers that fall out of the allowed and barred lists and are only allowed during the defined periods.

"Usage Quota" refers to the amount of call time that the mobile station is allowed. Calls made during the allowed periods are counted. Once the usage quota is reached, the call will be disconnected or rejected.

Of course, it is to be understood that this is not an exhaustive list of rules and others may be applied and that the above-referenced rules may be referred to by different names yet perform the same general functions.

The parental control rules are applicable for both outgoing and incoming calls and short messages. The Always Allowed, Always Barred, and Allowed Periods rules can be selectively applied to either voice or SMS, or both. Optionally, the end-user(s) (children) of the mobile station 12 may be able to query the parental control information through the service provider's Web site as well as by calling the service provider directly.

Figure 2:
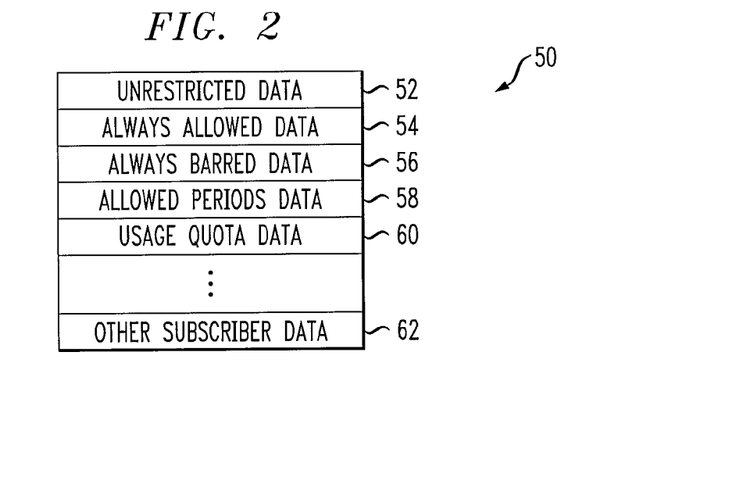
FIG. 2 is a memory layout of data stored in the Family Access Control database in accordance with an aspect of the present invention.

The FAC database 46 may include a number of data sub-blocks for each subscriber, as illustrated in FIG. 2. They are shown as a super block 50, not all of whose fields are filled for a particular subscriber. The super block, as known in the art, can be accessed from the identity of any one of several fields in the super block. The super block 50 may include the following data sub-blocks: a block 52 containing "Unrestricted" data; a block 54 containing "Always Allowed" data; a block 56 containing "Always Barred" data; a block 58 containing "Allowed Periods" data; and a block 60 containing "Usage Quota" data. Of course, any number of additional blocks 62 may be provided in the super block 50 for storing other subscriber data.

Figure 3:
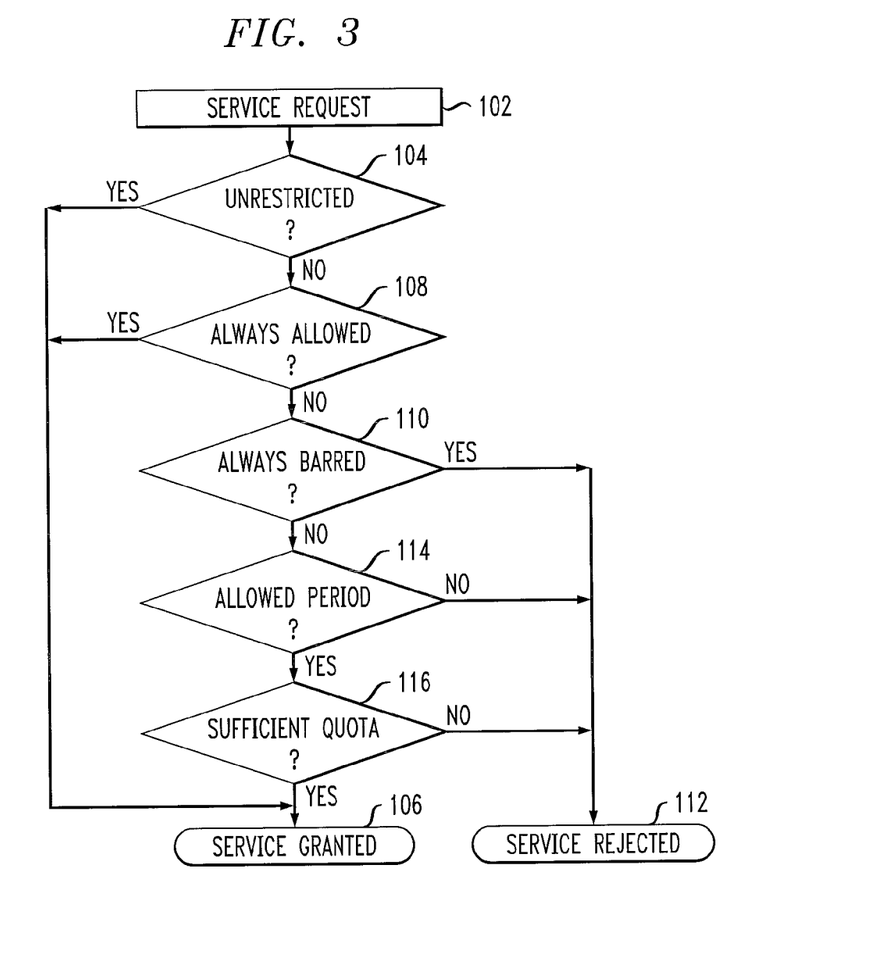
FIG. 3 is a flow chart illustrating a process for allowing end-users to control short message access of others in accordance with an aspect of the present invention.

A flow chart outlining an example of the SMSC 18 performing parental control for a short message is shown in FIG. 3. Initially, an SMS request with respect to a given directory number is made by the mobile station 12 (102). The SMSC 18 accesses the FAC database 46 to check whether the subscriber has enabled the parent control, which means that the "Unrestricted" field is set to "No" (104). If the "Unrestricted" field is set to "Yes," then service (i.e., the SMS request) will be granted (106). If the "Unrestricted" field is set to "No," then the "Always Allowed" field will be checked (108).

If the "Always Allowed" field is set to "Yes," then the SMS request will be granted (106). If the "Always Allowed" field is set to "No," then the "Always Barred" field will be checked (110).

If the "Always Barred" field is set to "Yes," then the SMS request will be rejected (112). If the "Always Barred" field is set to "No," then the "Allowed Periods" field will be checked (114).

If the "Allowed Periods" field is set to "No," then the SMS request will be rejected (106). If the "Always Barred" field is set to "Yes," then the SMSC 18 will check whether sufficient quota is available (116).

If there is sufficient quota available, then the SMS request will be granted (106). If there is not sufficient quota available, then the SMS request will be rejected (112).

FIGS. 4-7 show various call flows in accordance with aspects of the present invention.

Figure 4:
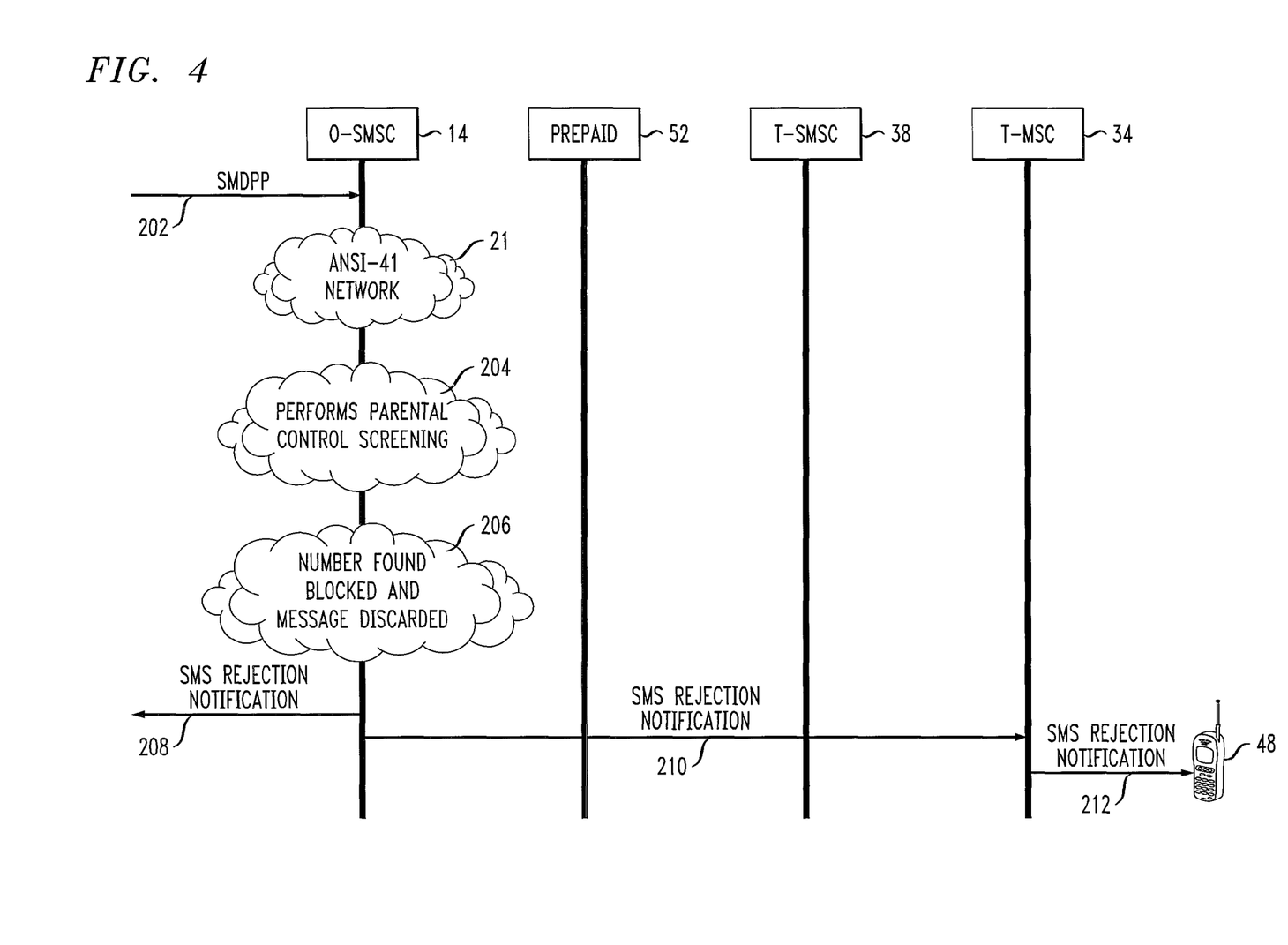
FIG. 4 is a call flow diagram for incoming messages that are blocked.

FIG. 4 covers the situation where the user (i.e., a child) attempts to send a short message via the mobile station 12, but the call is rejected or blocked. Initially, an ANSI-41 SMSDeliveryPointToPoint (SMDPP) message containing a short message from the first mobile station 12 for the second mobile station 32 is received by the originating SMSC 18 (202). The originating SMSC 18 sends an ANSI-41 SMSRequest message to the FAC 46 to perform parental control screening as outlined in FIG. 3 (204). Based on the data in the FAC database 46, the call is rejected and the short message is discarded (206). An SMS Rejection Notification is then forwarded from the originating SMSC 18 to the mobile station 12 (208). Optionally, the originating SMSC 18 also forwards an SMS Rejection Notification to the terminating MSC 34 (210), which forwards it to one or more of the subscriber's designated numbers or IP addresses (212). The Rejection Notification may also include the directory number that was blocked or other information.

Figure 5:
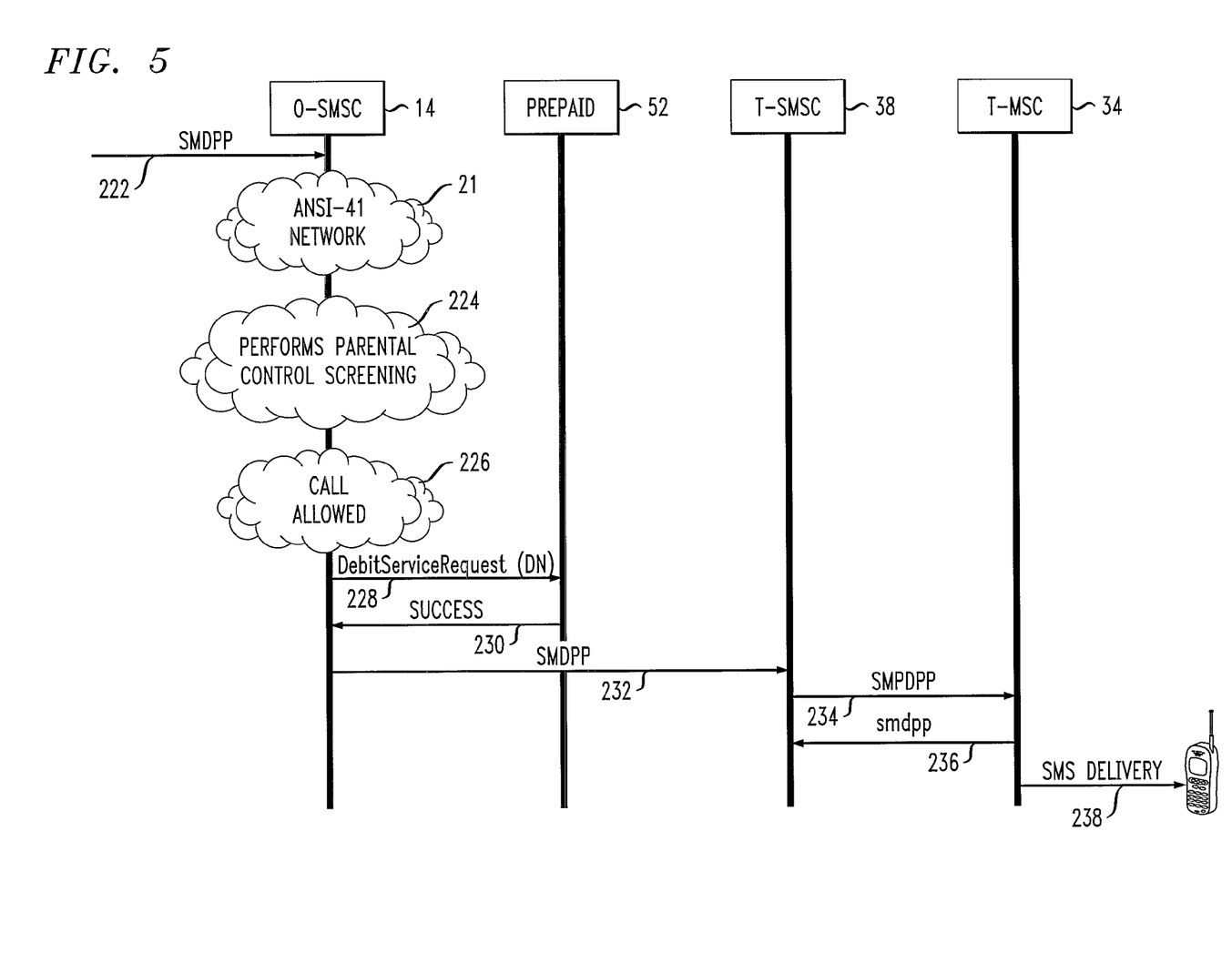
FIG. 5 is a call flow diagram for incoming messages that are allowed.

FIG. 5 covers the situation where the user (i.e., a child) attempts to send a short message via the mobile station 12, and the call is allowed. Initially, an SMDPP message containing a short message from the first mobile station 12 for the second mobile station 32 is received by the originating SMSC 18 (222). The originating SMSC 18 sends an ANSI-41 SMSRequest message to the FAC 46 to perform parental control screening as outlined in FIG. 3 (224). Based on the data in the FAC database 46, the call is allowed (226). The originating SMSC 18 then sends a DebitServiceRequest to the Prepaid function 52, if applicable, which checks its database and determines that sufficient funds are still available in the account to complete the call (228). As a result, the Prepaid function 52 responds with a Success message (230). The originating SMSC 18 then sends the short message in an SMDPP message to the terminating SMSC 38 (232), which forwards it to the terminating MSC 34 (234). The terminating MSC 34 responds with an smdpp acknowledgement message (236). Finally, the terminating MSC 34 forwards the SMDPP message with the short message to the second mobile station 32 (238).

Figure 6:
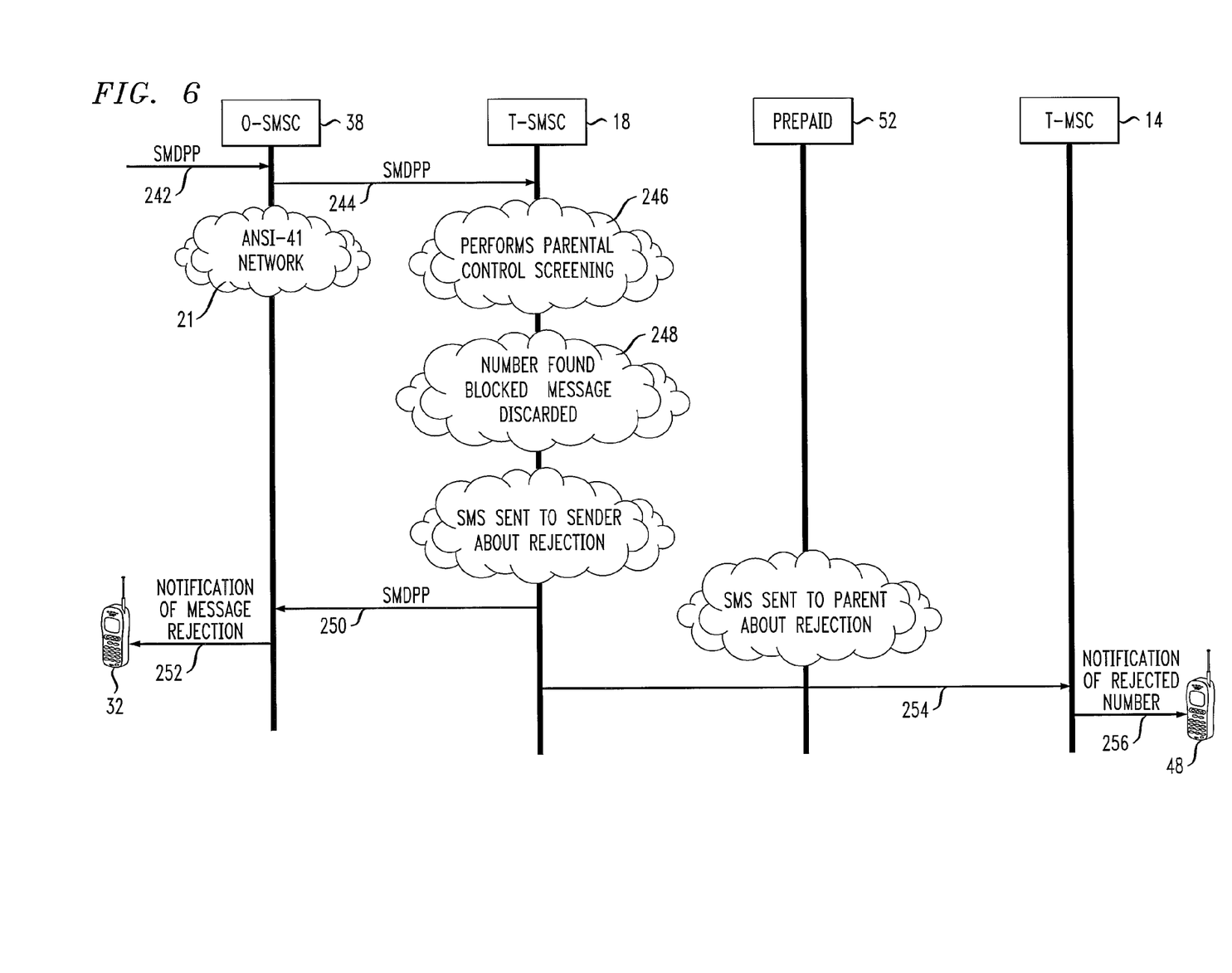
FIG. 6 is a call flow diagram for outgoing messages that are blocked.

FIG. 6 covers the situation where a short message is directed to the first mobile station 12, but the call is blocked. Initially, an SMDPP message containing a short message is received by the originating SMSC 38 (242). The originating SMSC 38 sends an SMDPP message to the terminating SMSC 18 to find out the location of the first mobile station 12 and whether it is eligible to receive the short message (244). The terminating SMSC 18 sends an SMSRequest message to the FAC 46 to perform parental control screening as outlined in FIG. 3 (246). Based on the data in the FAC database 46, the call is rejected and the short message is discarded (248). An SMDPP message containing an SMS Rejection Notification is forwarded from the terminating SMSC 18 to the originating SMSC 38 (250), which forwards the SMDPP message to the second mobile station 32, which had initiated the call (252). Optionally, the terminating SMSC 18 also forwards the SMDPP message with the SMS Rejection Notification to the terminating MSC 34 (254), which forwards it to one or more of the subscriber's designated numbers or IP addresses (256). The Rejection Notification may also include the directory number that was blocked or other information.

Figure 7:
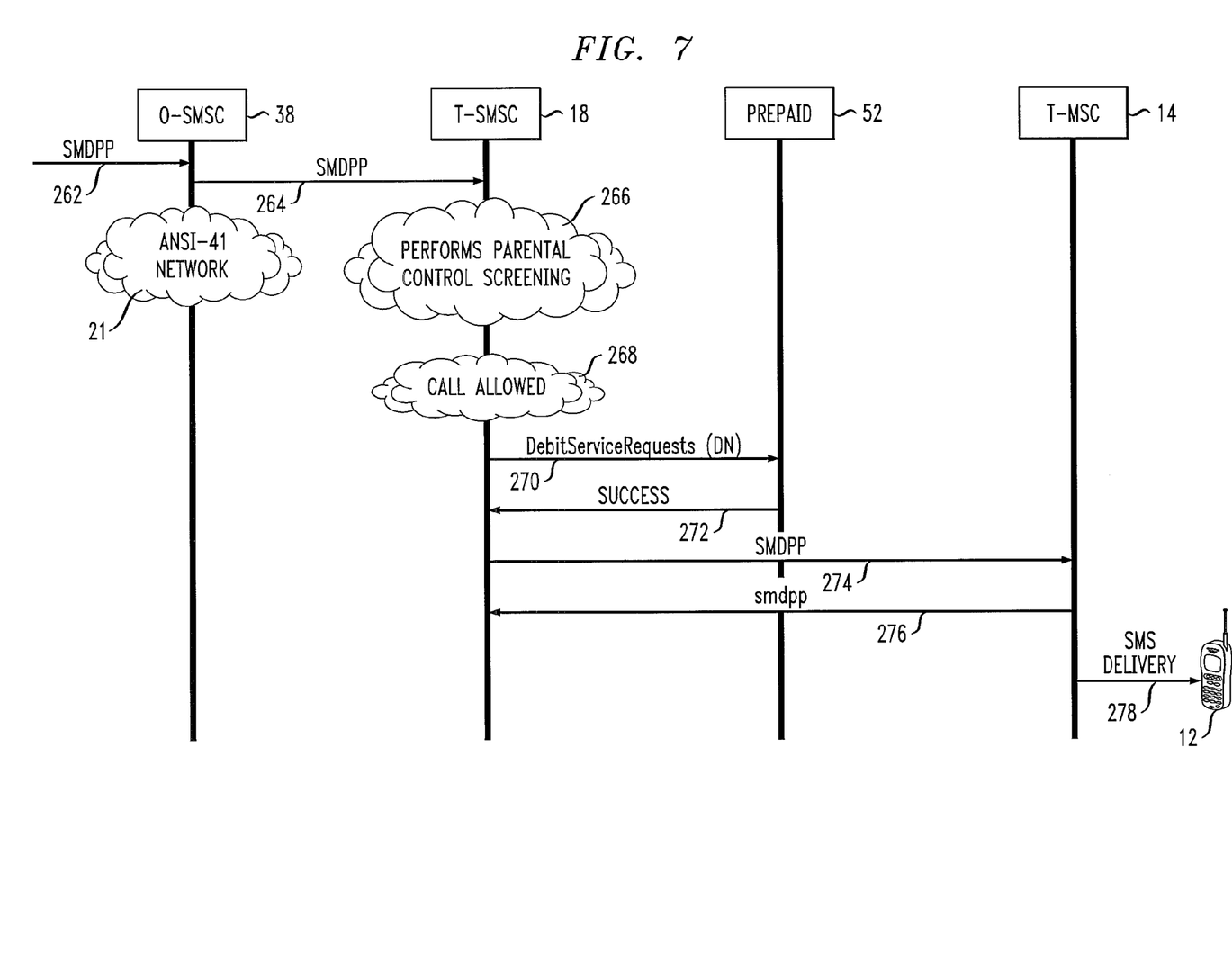
FIG. 7 is a call flow diagram for outgoing messages that are allowed.

FIG. 7 covers the situation where a short message is directed to the first mobile station 12, and the call is allowed. Initially, an incoming SMDPP message containing a short message is received by the originating SMSC 38 (262). The originating SMSC 38 sends an SMDPP message to the terminating SMSC 18 to find out the location of the first mobile station 12 and whether it is eligible to receive the short message (264). The terminating SMSC 18 sends an SMSRequest message to the FAC 46 to perform parental control screening as outlined in FIG. 3 (266). Based on the data in the FAC database 46, the call is granted (268). The terminating SMSC 38 then sends a DebitServiceRequest to the Prepaid function 52 (270), if applicable, which checks its database and determines that sufficient funds are still available in the account to complete the call and responds with a Success message (272). The terminating SMSC 38 then sends the short message in the SMDPP message to the terminating MSC 34 (274), which responds with an smdpp acknowledgement message (276) and forwards the SMDPP message to the first mobile station 12 (278). If the mobile is not able to receive a short message at that time, it can be retained by the terminating SMSC 18, and then forwarded when the terminating MSC 14 and the HLR 16 inform it that the mobile station 12 is again available.

The invention is not limited to SMS. SMS is a first generation GSM service. Enhanced Messaging Service (EMS) is an extension of SMS that permits messages with special text formatting (i.e., bold or italic), animations, pictures, icons, sound effects, and special ring tones. The service is very much based on the existing SMS. It basically extends the User Data Header (UDH) in SMS (UDH makes it possible to include binary information in the message header) and in fact needs no upgrade to the network infrastructure. The handsets, however, need to be EMS compliant.

The next step in the evolution of SMS, which requires some changes in the network infrastructure, is the Multimedia Messaging Service (MMS) that allows a combination of text, sounds, images and video. MMS supports pictures and interactive video. MMS permits users to send mobile greeting cards and visiting cards. MMS uses standardized protocols like WAP, MExE and SMTP. While EMS requires content reformatting for mobile devices, there is no such requirement for MMS. MMS may run on any bearer service, but practically requires GPRS or 3G bearer services. As opposed to SMS, MMS needs a dedicated channel. It also requires network elements like Multimedia Messaging Relays, MMS Server and MMS User Databases. MMS is being standardized by the 3rd Generation Partnership Project (3GPP). EMS standards are a part of 3GPP technical specification: 3G TS 23.040, "Technical realization of the Short Message Service (SMS)".

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of processing short message service (SMS) calls for a subscriber's communication device in a communication network, the method comprising:

receiving an SMS request involving the communication device at a short message service center;

accessing a family access control database storing family access control information for SMS with respect to the communication device, wherein the family access control information stored in the family access control database includes an indication whether the family access control service has been enabled or disabled for the communication device;

determining whether the short message service request should be allowed or denied based on the family access control information found in the database;

sending an SMS rejection notification to the communication device, the SMS rejection notification being forwarded from an originating short message service center to the communication device attempting to send a message, when the SMS request is denied;

sending the SMS rejection notification to one or more of the subscriber's designated numbers or IP addresses, the SMS rejection notification being forwarded from the originating short message service center to the subscriber via a terminating short message service center, when the SMS request is denied.

2. The method defined in claim 1, further comprising: receiving family access control information from the subscriber for the communication device via the Internet.

3. An apparatus for processing short message service (SMS) calls for a subscriber's communication device in a communication network, the system comprising:

a family access control database storing family access control information for the communication device, wherein the family access control information stored in the family access control database includes an indication whether the family access control service has been enabled or disabled for the communication device;

a short message service center, wherein the short message service center is operative to access the family access control database and determine whether a short message service request should be allowed or denied based on the family access control information found in the database, wherein the short message service center is further operative to send an SMS rejection notification to the communication device, the first SMS rejection notification being forwarded to the communication device attempting to send a message, when the SMS request is denied, and wherein the short message service center is further operative to send the SMS rejection notification to the communication device, the SMS rejection notification being forwarded to the communication device attempting to send a message, when the SMS request is denied.

4. The apparatus defined in claim 3, wherein the short message service center is further operative to receive family access control information from a subscriber for the communication device via the Internet.

5. A non-transitory computer-usable data carrier storing instructions that, when executed by a computer, cause the computer to:

receive an SMS request at a short message service center;

access a family access control database storing family access control information for the communication device, wherein the family access control information stored in the family access control database includes an indication whether the family access control service has been enabled or disabled;

determine whether the short message service request should be allowed or denied based on the family access control information found in the database;

send an SMS rejection notification to the communication device, the SMS rejection notification being forwarded from an originating short message service center to the communication device attempting to send a message, when the SMS request is denied;

send the SMS rejection notification to one or more of the subscriber's designated numbers or IP addresses, the SMS rejection notification being forwarded from the originating short message service center to the subscriber via a terminating short message service center, when the SMS request is denied.

6. The non-transitory computer-usable data carrier defined in claim 5, wherein the set of program instructions further comprises instructions for receiving family access control information from a subscriber for the communication device via the Internet.

* * * * *